United States Patent
Nakakuki et al.

(10) Patent No.: US 9,796,414 B2
(45) Date of Patent: Oct. 24, 2017

(54) ELECTRIC POWER STEERING DEVICE AND CONTROL DEVICE OF ELECTRIC POWER STEERING DEVICE

(71) Applicant: HITACHI AUTOMOTIVE SYSTEMS STEERING, LTD., Hiki-gun, Saitama (JP)

(72) Inventors: Yasuhito Nakakuki, Atsugi (JP); Kazuya Yamano, Yamato (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 85 days.

(21) Appl. No.: 14/875,395

(22) Filed: Oct. 5, 2015

(65) Prior Publication Data
US 2016/0096545 A1 Apr. 7, 2016

(30) Foreign Application Priority Data
Oct. 6, 2014 (JP) ................................ 2014-205350

(51) Int. Cl.
*B62D 5/04* (2006.01)
(52) U.S. Cl.
CPC ................................ *B62D 5/0469* (2013.01)
(58) Field of Classification Search
None
See application file for complete search history.

(56) References Cited

U.S. PATENT DOCUMENTS

| | | | | |
|---|---|---|---|---|
| 6,370,459 B1* | 4/2002 | Phillips | ............ | B62D 5/0436 180/443 |
| 6,470,994 B1* | 10/2002 | Shimizu | ............ | B62D 6/008 180/446 |
| 6,499,559 B2* | 12/2002 | McCann | ............ | B62D 5/0463 180/446 |
| 8,634,986 B2* | 1/2014 | Ghoneim | ............ | B62D 5/0481 701/32.9 |
| 8,718,873 B2* | 5/2014 | Kushiro | ............ | B62D 5/0463 701/41 |
| 9,452,778 B2* | 9/2016 | Heilig | ............ | B62D 5/0463 |
| 2001/0001932 A1* | 5/2001 | Kobayashi | ............ | B62D 3/12 74/388 PS |
| 2001/0054527 A1* | 12/2001 | Card | ............ | F16F 9/535 188/267.1 |
| 2005/0016791 A1* | 1/2005 | Fukushima | ............ | B62D 6/008 180/446 |

(Continued)

FOREIGN PATENT DOCUMENTS

JP 2008-290525 A 12/2008

*Primary Examiner* — Truc M Do
(74) *Attorney, Agent, or Firm* — Foley & Lardner LLP (57) ABSTRACT

In order to suppress an electric power steering device from generating a contact noise due to operation of a mechanical stopper and a rack stopper, there is provided a control unit in which a command signal Io applied to an electric motor used for assisting the steering power is calculated taking into consideration both a rack stopper side damping correction represented by a rack side damping correction signal Dr calculated in a rack side damping correction amount calculation part 21 and a mechanical stopper side damping correction represented by a mechanical side damping correction signal Dm calculated in a mechanical side damping correction amount calculation part 23.

20 Claims, 8 Drawing Sheets

(56) References Cited

U.S. PATENT DOCUMENTS

| | | | |
|---|---|---|---|
| 2005/0182541 A1* | 8/2005 | Tamaizumi | B62D 5/046 701/41 |
| 2007/0021889 A1* | 1/2007 | Tsuchiya | B62D 1/286 701/41 |
| 2008/0243339 A1* | 10/2008 | Nishimori | B60G 7/003 701/41 |
| 2012/0271513 A1* | 10/2012 | Yoneda | B62D 5/0493 701/41 |
| 2013/0197757 A1* | 8/2013 | Ellis | B62D 5/0463 701/41 |
| 2013/0233639 A1* | 9/2013 | Kodato | B62D 5/0463 180/446 |

* cited by examiner

ELECTRIC POWER STEERING DEVICE AND CONTROL DEVICE OF ELECTRIC POWER STEERING DEVICE

BACKGROUND OF THE INVENTION

1. Field of the Invention

The present invention relates to an electric power steering device applied to wheeled motor vehicles, and a control device for controlling the electric power steering device.

2. Description of the Related Art

One of known electric power steering devices is shown in Japanese Laid-open Patent Application (tokkai) 2008-290525. The electric power steering device of the publication has a so-called "rack stopper controller" through which undesired collision noise, which would be produced when a rack bar (viz., part of a rack and pinion mechanism) is brought to its terminal end, is suppressed or at least minimized. For the suppression, the rack stopper controller lowers the power of an electric motor or applies a counter torque to the rack bar in a direction opposite to a steering torque when the rack bar comes near the terminal end.

SUMMARY OF THE INVENTION

However, in the above-mentioned known electric power steering device, a so-called mechanical stopper for regulating a relative rotation between input and output shafts is not given little thought in the noise production. Thus, when, with the movement of the rack bar kept restricted due to the output control of the electric motor or the like, the driver intends to turn the steering wheel further in the same direction, the torsion bar is more easily twisted due to the restriction of movement of the rack bar and thus, undesired collision noise tends to be produced by the mechanical stopper.

Accordingly, the present invention is provided by taking the above-mentioned drawback of the known electric power steering device into consideration.

That is, according to the present invention, there is provided an electric power steering device that is suppressed from producing not only collision noise of the rack stopper but also collision noise of the mechanical stopper.

In accordance with a first aspect of the present invention, there is provided an electric power steering device which comprises a steering mechanism including a first shaft connected to a steering wheel, a second shaft connected to the first shaft through a torsion bar and a rack bar connected to the second shaft through a rack-and-pinion mechanism; a mechanical stopper including first and second stopper parts respectively provided by the first and second shafts, the first and second stopper parts being brought into contact to each other to suppress a further relative rotation between the first and second shafts when the first and second shafts make a given amount of relative rotation therebetween while twisting the torsion bar; an electric motor that provides the steering mechanism with a steering power for assisting a steering operation applied to the steering wheel; and a control unit for controlling the electric motor, the control unit including a steering torque signal receiving part into which a steering torque signal produced in the steering mechanism is received; a steering angle signal receiving part into which a steering angle signal representing a steered angle of a steered road wheel is received; a torsion bar twist amount signal receiving part into which a torsion bar twist amount signal, which represents a twisted amount of the torsion bar, is received; a basic assist command signal calculation part by which a basic assist command signal for the electric motor is calculated based on the steering torque signal; a first damping signal calculation part that calculates a first damping signal when the steering angle signal represents that the steered angle is equal to or greater than a first given angle and the steering wheel is being turned further in the same direction, the first damping signal representing a damping force against a steering force produced by the electric motor when the steering wheel is turned further in the same direction; a second damping signal calculation part that calculates a second damping signal when the torsion bar twist amount signal represents that the torsion bar twist amount is equal to or greater than a second given angle and the steering wheel is being turned further in the same direction, the second damping signal representing a damping force against a steering force produced by the electric motor when the steering wheel is turned further in the same direction; a damping correction amount calculation part that calculates a damping correction amount, which is a correction amount of the basic assist command signal effected by the first and second damping signals, based on either one of the steering angle signal, a first control amount calculated based on the steering angle signal, the torsion bar twist amount signal and a second control amount calculated based on the torsion bar twist amount signal; and a motor command signal output part that outputs to the electric motor a command signal based on the basic assist command signal and the damping correction amount.

In accordance with a second aspect of the present invention, there is provided a control device for controlling an electric power steering device, the electric power steering device including a steering mechanism that includes a first shaft connected to a steering wheel, a second shaft connected to the first shaft through a torsion bar and a rack bar connected to the second shaft through a rack-and-pinion mechanism, a mechanical stopper that includes first and second stopper parts respectively provided by the first and second shafts wherein the first and second stopper parts are brought into contact to each other to suppress a relative rotation between the first and second shafts when the first and second shafts make a given relative rotation therebetween while twisting the torsion bar, and an electric motor that provides the steering mechanism with a steering power for assisting a steering operation applied to the steering wheel, said control device comprising a steering torque signal receiving part into which a steering torque signal produced in the steering mechanism is received; a steering angle signal receiving part into which a steering angle signal representing a steered angle of a steered road wheel is received; a torsion bar twist amount signal receiving part into which a torsion bar twist amount signal, which represents a twisted amount of the torsion bar, is received; a basic assist command signal calculation part by which a basic assist command signal for the electric motor is calculated based on the steering torque signal; a first damping signal calculation part that calculates a first damping signal when the steering angle signal represents that the steered angle is equal to or greater than a first given angle and the steering wheel is being turned further in the same direction, the first damping signal representing a damping force against a steering force produced by the electric motor when the steering wheel is turned further in the same direction; a second damping signal calculation part that calculates a second damping signal when the torsion bar twist amount signal represents that the torsion bar twist amount is equal to or greater than a second given angle and the steering wheel is being turned further in the same direction, the second damping signal representing a damping force against a steering force produced by the electric motor when the steering wheel is turned further in the same direction; a damping correction amount calculation part that calculates a damping correction amount, which is a correction amount of the basic assist command signal effected by the first and second damping signals, based on either one of the steering angle signal, a first control amount calculated based on the steering angle signal, the torsion bar twist amount signal and a second control amount calculated based on the torsion bar twist amount signal; and a motor command signal output part that outputs to the electric motor a command signal based on the basic assist command signal and the damping correction amount.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, an electric power steering device of the present invention will be described in detail with reference to the accompanying drawings.

The following description will be made based on an arrangement wherein the electric power steering device of the invention is practically applied to known wheeled motor vehicles. Furthermore, operation of the electric power steering device will be explained under the stipulation as an example that a disturbance is caused by running of an associated motor vehicle on a travelling road with a transverse slope.

Figure 1:
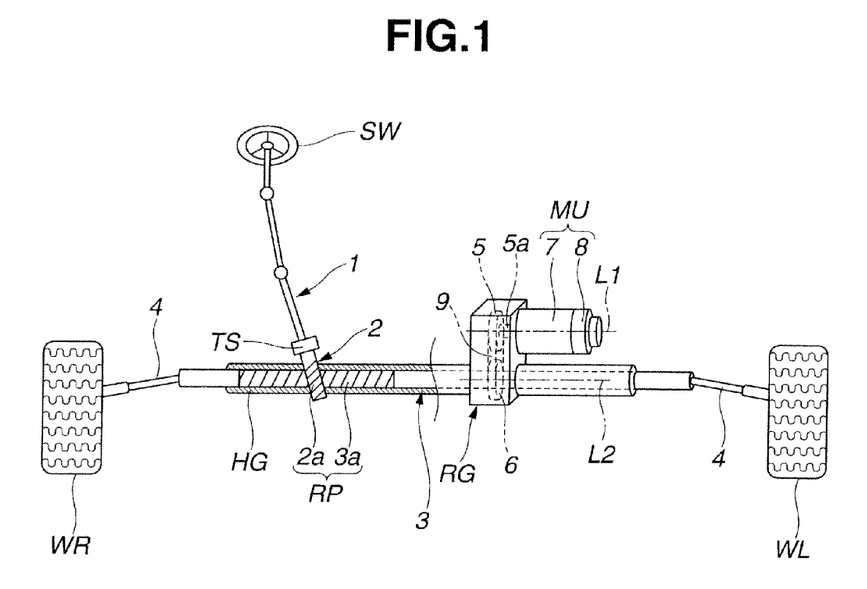
FIG. 1 is a schematic drawing of an electric power steering device according to the present invention.

Referring to FIG. 1, there is schematically shown an electric power steering device according to the present invention.

As is shown in the drawing, the electric power steering device of the invention generally comprises an input shaft 1 (viz., first shaft) having an upper end that is connected through universal joints to a steering wheel SW to achieve an integral rotation therebetween, an output shaft 2 (viz., second shaft) having both an upper end that is connected through a torsion bar TB (see FIG. 2) to a lower end of the input shaft 1 to achieve a relative rotation therebetween and a lower end that is linked to left and right steered road wheels WL and WR through a rack-and-pinion mechanism RP, a torque sensor TS that detects a steering torque based on a relative rotation amount between the input and output shafts 1 and 2, a vehicle speed sensor (not shown) that detects a speed of the associated motor vehicle, a motor unit MU that applies a steering assist torque to an after-mentioned rack bar 3 of the rack- and pinion mechanism in accordance with the steering torque of a driver based on detection results of the torque sensor TS, the vehicle speed sensor and other sensors, and a transmission mechanism RG that converts an output (turning force or torque) of the motor unit MU to an axial displacement of the rack bar 3 while reducing the speed of the output. As will become apparent as the description proceeds, a steering mechanism employed in the invention comprises the input shaft 1, the output shaft 2 and the rack-and-pinion mechanism RP.

As will be understood from FIG. 1, the rack-and-pinion mechanism RP comprises a pinion gear 2a formed on the lower end of the output shaft 2 and straight rack teeth 3a formed on the rack bar 3 and meshed with the pinion gear 2a. Usually, the rack teeth 3a are provided on a limited axial zone of the rack bar 3. Thus, in response to rotation of the output shaft 2, the rack bar 3 is forced to move axially in right or left direction. As shown, the rack bar 3 is axially slidably received in a rack housing HG.

Both ends of the rack bar 3 are connected through respective tie rods 4 and 4 and knuckle arms (not shown) to the right and left steered road wheels WR and WL, so that in response to the axial movement of the rack bar 3, steered angles of the two steered road wheels WR and WL are changed through the tie rods 4 and 4 while pulling the knuckle arms.

Although not well shown in FIG. 1, both ends of the rack bar 3 are formed with enlarged rack ends that are exposed from respective ends of the rack housing HG. Thus, each enlarged rack end of the rack bar 3 and corresponding end of the rack housing HG constitute a so-called rack stopper. Two rack stoppers are thus provided at both ends of the rack housing HG. Accordingly, once, due to movement of the rack bar 3, one of the enlarged rack ends of the rack bar 3 is brought into contact with the corresponding end of the rack housing HG, further movement of the rack bar 3 in the same direction is suppressed. Usually, each enlarged rack end is equipped with a shock absorbing bush for absorbing a shock produced when the enlarged rack end abuts against the corresponding end of the rack housing HG.

The motor unit MU comprises an electric motor 7 that applies the steering assist torque to the rack bar 3 by turning an after-mentioned input pulley 5 through the transmission mechanism RG, and an electronic control unit 8 that is integrally mounted on the electric motor 7 to control the operation of the electric motor 7 in accordance with predetermined parameters such as the steering torque, the vehicle speed and the like.

The transmission mechanism RG generally comprises the above-mentioned input pulley 5 that is integrally mounted on an output shaft 7a of the electric motor 7 to rotate about an axial line L1 of the output shaft 7a, an output pulley 6 that is rotatably disposed about the rack bar 3 and rotated about an axial line L2 of the rack bar 3 in accordance with the rotation of the input pulley 5, a ball-screw mechanism (not shown) that is operatively disposed between the output pulley 6 and the rack bar 3 so as to convert the rotation of the output pulley 6 to a slow axial movement of the rack bar 3, and an endless belt 9 that is put on both the input and output pulleys 5 and 6 to transmit rotation of the input pulley 5 to the output pulley 6.

Figure 2:
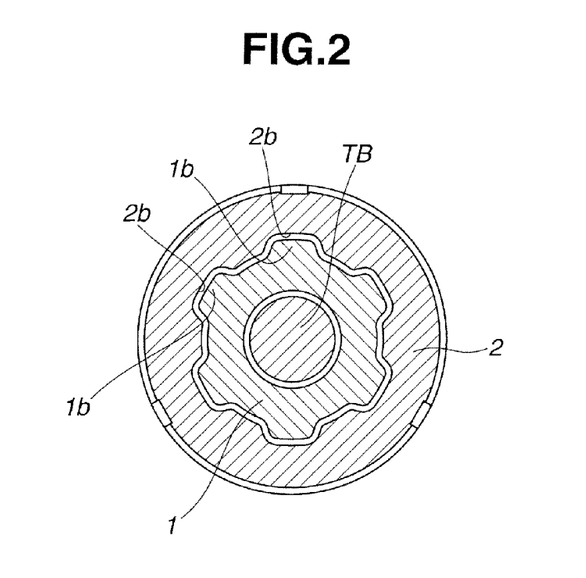
FIG. 2 is an enlarged sectional view of a part where input and output shafts of a steering shaft structure are operatively engaged.

Referring to FIG. 2, there is shown an enlarged sectional view of a part where the input and output shafts 1 and 2 of the steering shaft structure are operatively engaged.

As will be seen from this drawing, one part of the input shaft 1 is formed with a plurality of raised portions 1b that are equally spaced from one another. A corresponding part of the output shaft 2 is formed with a plurality of recessed portions 2b that are equally spaced from one another and arranged and sized to respectively receive therein the raised portions 1b of the input shaft 1. As will become apparent hereinafter, the raised portions 1b of the input shaft 1 serves as a first shaft side restriction part, and the recessed portions 2b of the output shaft 2 serve as a second shaft side restriction part.

That is, the raised portions 1b and the recessed portions 2b constitute a so-called mechanical stopper by which the relative rotation amount between the input and output shafts 1 and 2 is suppressed.

Due to provision of such mechanical stopper, breakage of the torsion bar TB through the two shafts 1 and 2 are connected is suppressed. More specifically, the circumferential length of each recessed portion 2b of the output shaft 2 is set somewhat larger than that of each raised portion 1b of the input shaft 1, so that the input and output shafts 1 and 2 are permitted to make a certain relative rotation therebetween. Upon abutment of one side surface of each raised portion 1b of the input shaft 1 against a corresponding side surface of each recessed portion 2b of the output shaft 2, further relative rotation between the two shafts 1 and 2 is suppressed.

First Embodiment

Figure 3:
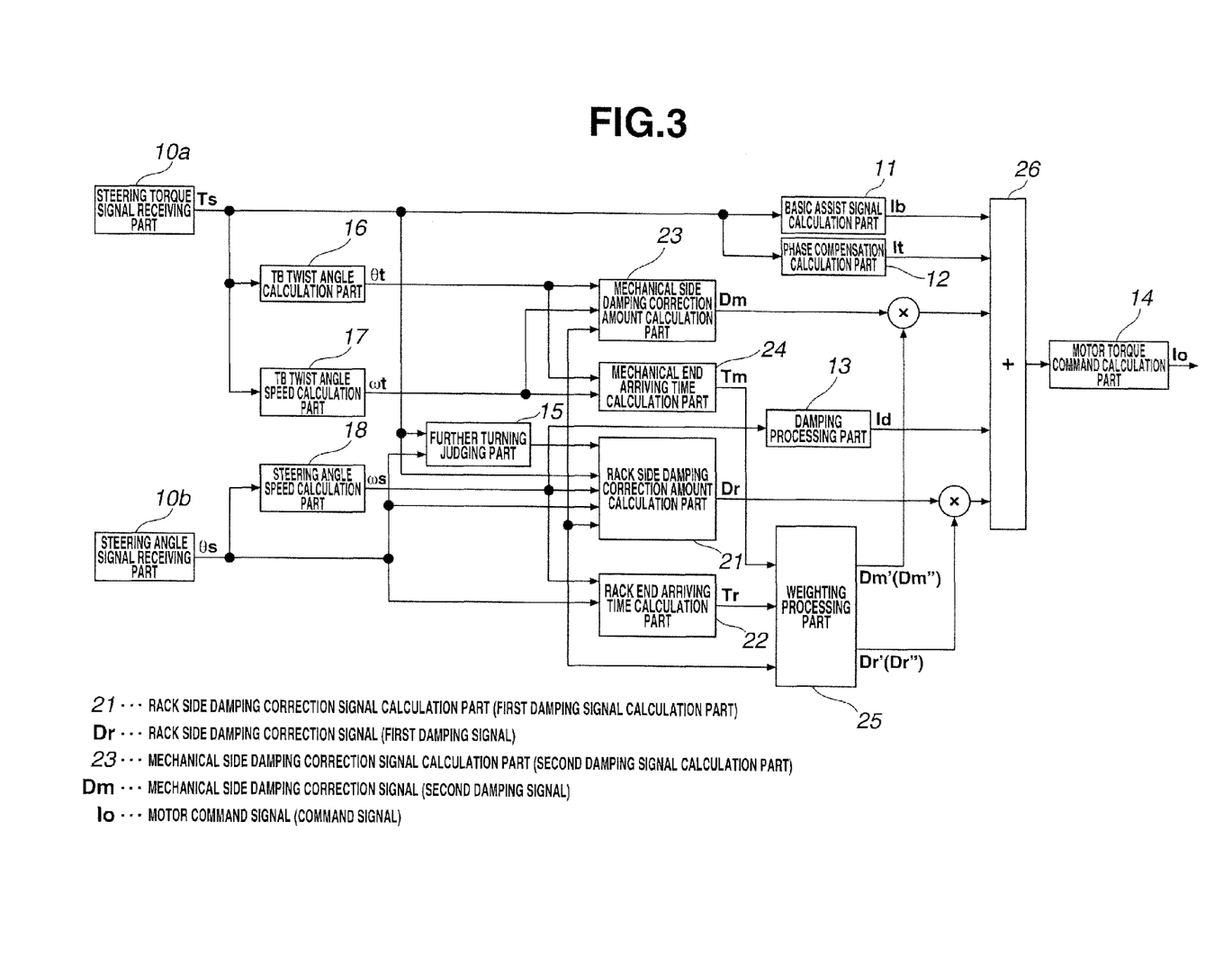
FIG. 3 is a block diagram of a control unit employed in the electric power steering device of the present invention.

Referring to FIG. 3, there is shown a block diagram of a control unit that is employed in a first embodiment of the present invention for carrying out a damping correction control to a steering assist torque.

As shown in FIG. 3, the above-mentioned electronic control unit 8 (see FIG. 1) is equipped with both a steering torque signal receiving part 10a that receives a steering torque signal Ts issued from the torque sensor TS and a steering angle signal receiving part 10b that receives a steering angle signal θs issued from a steering angle sensor (not shown).

Based on the steering torque signal Ts, a basic assist signal calculation part 11 calculates a basic assist signal Ib that constitutes a base of the steering assist torque, and a phase compensation calculation part 12 calculates a phase compensation signal It which effects a phase compensation to the steering torque signal Ts.

While, based on the steering angle signal θs, a steering angular velocity calculation part 18 differentiates the steering angle signal θs to calculate a steering angular velocity signal ωs, and based on this steering angular velocity signal ωs, a damping process part 13 outputs a damping process signal Id which is used for changing a steering assist control characteristic in accordance with the steering angular velocity signal ωs.

Based on both the steering torque signal Ts and the steering angle signal θs, a further turning judge part 15 judges to whether the steering wheel has been further steered in the same direction or steered in a return direction.

Based on the result of the judging, the steering angle signal θs and the steering angular velocity signal of ωs, a rack side damping correction amount calculation part 21 calculates a rack side damping correction signal Dr that corresponds to a first damping signal of the present invention, and a rack end arriving time calculation part 22 calculates a rack end arriving time signal Tr that corresponds to a first control amount of the present invention.

Based on the above-mentioned steering torque signal Ts, a TB (Torsion Bar) twist angle calculation part 16 calculates a TB twist angle signal θt that corresponds to a torsion bar twist amount signal (viz., a signal representing a torsion bar twist angle) of the present invention, and a TB twist angular velocity calculation part 17 calculates a TB twist angular velocity signal ωt that represents a twist angular velocity of the torsion bar.

And, based on the result of the judgment of the further turning judge part 15 and the TB twist angle signal θt and TB twist angular velocity signal ωt, a mechanical side damping correction amount calculation part 23 calculates a mechanical side damping correction signal Dm that corresponds to a second damping signal of the present invention, and a mechanical end arriving time calculation part 24 calculates a mechanical end arriving time signal Tm that corresponds to a second control amount of the present invention.

The rack side damping correction signal Dr and the mechanical side damping correction signal Dm are subjected to a weighting process by a weighting process part 25 based on an after-mentioned predetermined condition. That is, at this part 25, predetermined gains are applied to the rack end arriving time signal Tr and the mechanical end arriving time signal Tm based on these signals Tr and Tm thereby to calculate a weighted rack side damping increase correction signal Dr' and a weighted mechanical side damping increase correction signal Dm'. As is seen from the diagram of FIG. 3, an adder 26 placed just in front of a motor command signal output part 14 constitutes a damping correction amount calculation part.

The ratio of the size of the above-mentioned weighted rack side damping increase correction signal Dr' to the size of the weighted mechanical side damping increase correction signal Dm' is set to vary from 0/100 to 100/0.

And, based on the above-mentioned basic assist signal Ib, the rack side damping correction signal Dr and the mechanical side damping correction signal Dm (rack side damping increase correction signal Dr' and mechanical side damping increase correction signal Dm'), the motor command signal output part 14 outputs to the electric motor 7 (see FIG. 1) a command signal I as a motor command signal Io. It is to be noted that the command signal I (or Io) is a damping corrected signal that is provided by correcting the basic assist signal Ib by the rack side damping correction signal Dr and mechanical side damping correction signal Dm.

Figure 4:
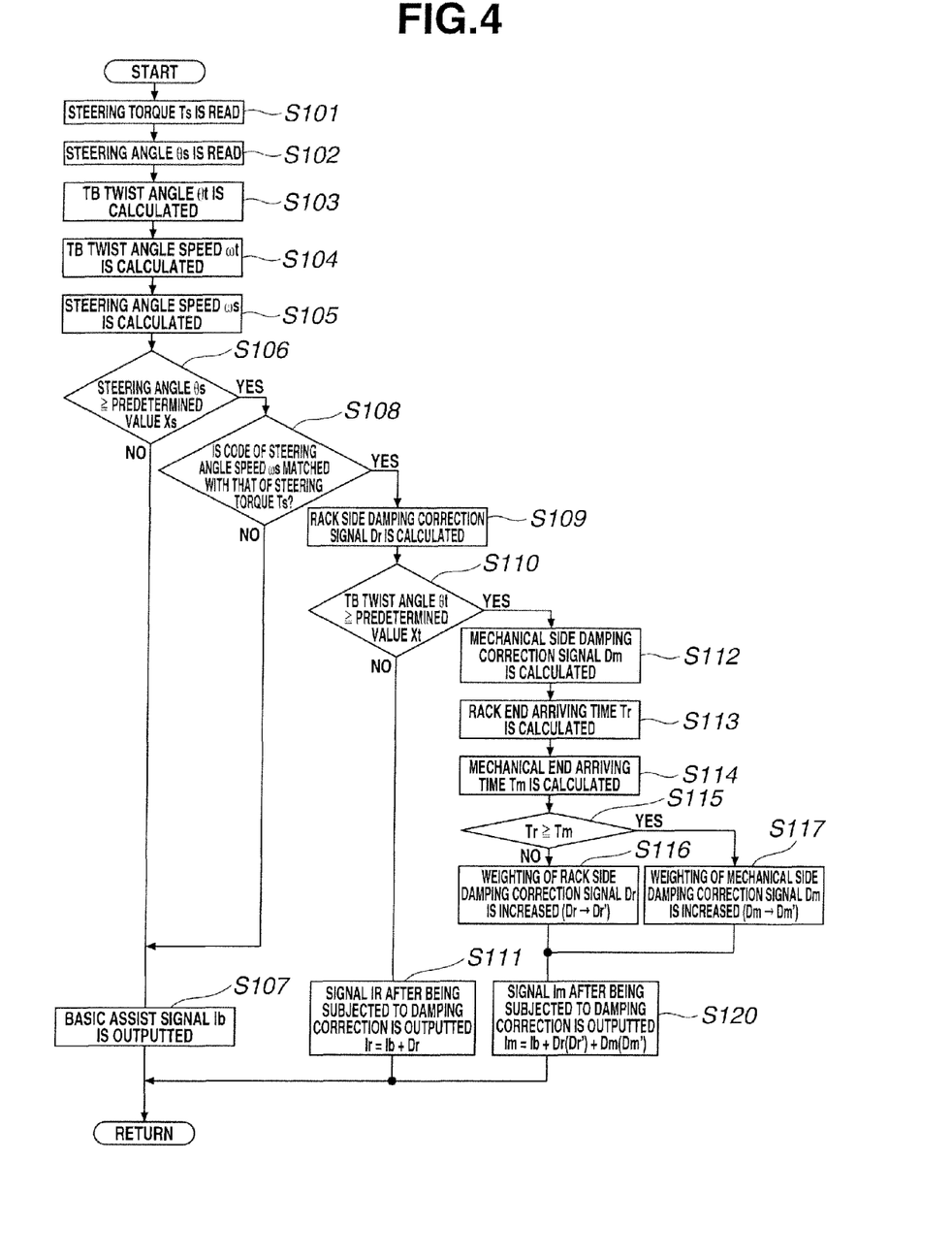
FIG. 4 is a flowchart showing programmed operation steps carried out in a control unit in a first embodiment of the present invention for carrying out a damping correction control to a steering assist torque.

Referring to FIG. 4, there is shown a flowchart that depicts programmed operation steps executed in the first embodiment of the present invention for carrying out the damping correction control of the steering assist torque.

As shown, at step S101, a steering torque signal Ts detected by the torque sensor (see FIG. 1) is read, and at step S102, a steering angle signal θs detected by a steering angle sensor is read. Then, based on the steering torque signal Ts thus read, a TB twist angle signal θt is calculated at step S103 and a TB twist angular velocity signal ωt is calculated at step S104, and thereafter, based on the steering angle signal θs thus read, a steering angular velocity signal ωs is calculated at step S105.

Then, at step S106, judgment is carried out as to whether the steering angle signal θs is equal to or larger than a predetermined value Xs or not. If NO at step S106, the operation flow goes to step S107 to output a basic assist signal Ib as a motor command signal Io and the operation flow goes to RETURN. While, if YES at step S106, the operation flow goes to step S108 where judgment is carried out as to whether or not a code of the steering torque signal Ts coincides with that of the steering angular velocity signal ωs. If NO at step S108, the operation flow goes to step S107 to output the basic assist signal Ib as the motor command signal Io and the operation flow goes to RETURN.

While, if YES at step S108, the operation flow goes to step S109 where a rack side damping correction signal Dr is calculated, and then the operation flow goes to step S110 where judgment is carried out as to whether the TB twist signal θt is equal to or larger than a predetermined value Xt or not.

If NO at step S110, the operation flow goes to step S111 where a command signal Ir (=command signal subjected to a damping correction) that is provided by adding the rack side damping correction signal Dr to the basic assist signal Ib is outputted as a motor command signal Io.

While, If YES at step S110, the operation flow goes to step S112 where a mechanical side damping correction signal Dm is calculated, and then the operation flow goes to step S113 where a rack end arriving time Tr is calculated, and to step S114 where a mechanical end arriving time Tm is calculated. Thereafter, the operation flow goes to step S115 where judgment is carried out as to whether or not the rack end arriving time Tr is equal to or longer than the mechanical end arriving time TM.

If NO at step S115, the operation flow goes to step S116 where a rack side damping increase correction signal Dr' is calculated. As has been mentioned hereinabove, the signal Dr' is provided by increasing the weighting of the rack side damping correction signal Dr by applying a gain to the rack side damping to correction signal Dr. While, if YES at step S115, the operation flow goes to step S117 where a mechanical side damping increase correction signal Dm' is calculated. As has been mentioned hereinabove, the signal Dm' is provided by increasing the weighting of the mechanical side damping correction signal Dm by applying a gain to the mechanical side damping correction signal Dm. Thereafter, the operation flow goes to step S120 where a corrected command signal Im is outputted as a motor command signal Io. It is to be noted that the corrected command signal Im is provided by adding to the basic assist signal Ib both the rack side damping correction signal Dr (rack side damping increase correction signal Dr') and the mechanical side damping correction signal Dm (mechanical side damping increase correction signal Dm').

As will be understood from the above description, in the first embodiment of the present invention, since the rack side damping correction signal Dr is calculated with respect to the rack end arriving time Tr, correction on the operation of the rack stopper side is practically achieved. Furthermore, since the mechanical side damping correction signal Dm is calculated with respect to the mechanical end arriving time Tm, correction on the operation of the mechanical stopper is also practically achieved. Accordingly, in this first embodiment, a collision noise of the rack end as well as a collision noise produced between the input side restricting portion 1b (or raised portions 1b, see FIG. 2) and the output side restriction portion 2b (or recessed portions 2b, see FIG. 2), which constitute the mechanical stopper, can be suppressed or at least minimized.

More specifically, advantages expected by the rack stopper side, which tend to make the contact at first, will be described. In case of this rack stopper side, after the rack side damping correction signal Dr is calculated based on a calculation condition of the rack side damping correction signal Dr, the mechanical side damping correction signal Dm is calculated based on a calculation condition of the mechanical side damping correction signal Dm. Accordingly, stepwise corrections of the signals Dr and Dm are possible as needed, and thus when the calculation conditions of the signals Dr and Dm are satisfied, the damping corrections of them are carried out, and thus, much effective damping correction is achieved.

It is to be noted that that first contact may be provided by either one of the rack stopper and the mechanical stopper. That is, by making the contact of the mechanical stopper prior to the rack stopper, the durability of a shock absorber (bush) provided to the rack stopper can be increased. While, by making the contact of the rack stopper prior to the mechanical stopper, shocks applied to the torque sensor TS provided between the input and output shafts 1 and 2 cam be suppressed.

For carrying out the damping correction to the motor command signal Io, both the rack side damping correction signal Dr and the mechanical side damping correction signal Dm are weighted causing the ratio of the size of the signal Dr to the size of the signal Dm to be variable. Accordingly, suitable damping correction amount can be calculated in accordance with the steering condition.

In the above-mentioned first embodiment, only one of the damping correction signals Dr and Dm is subjected to the weighting-increase.

Figure 5:
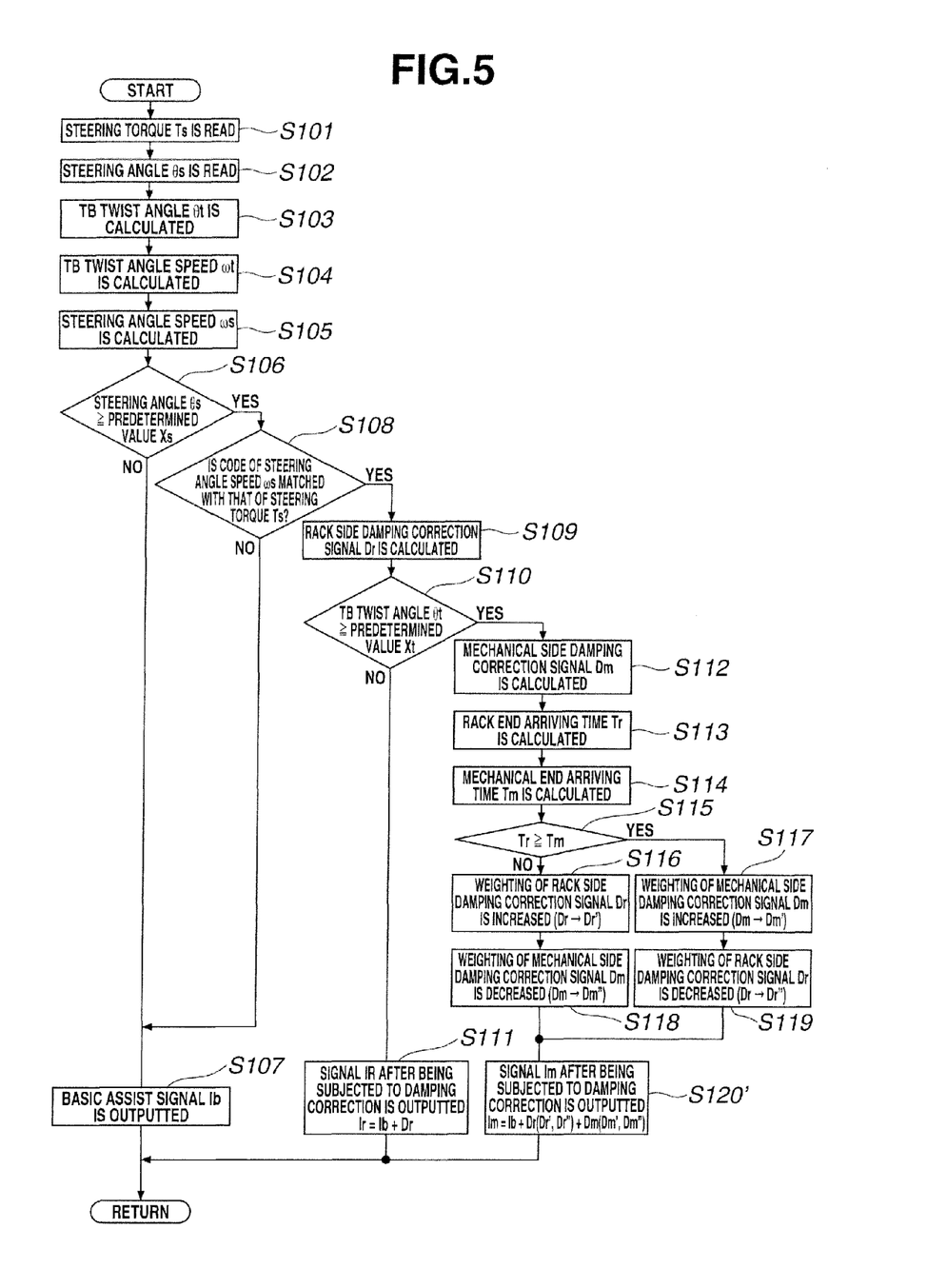
FIG. 5 is a flowchart showing programmed operation steps carried out in a control unit in a first modification of the first embodiment of the present invention.

However, if desired, as is seen from operation steps S118 and S119 of a flowchart of FIG. 5, one of the damping correction signals Dr and Dm may be subjected to the weighting-increase and the other of the damping correction signals Dr and Dm may be subjected to the weighting-decrease. With this modification, much effective damping correction control is achieved.

In the above-mentioned first embodiment, the ratio of the size of the rack side damping correction signal Dr to the size of the mechanical side damping correction signal Dm is set to vary from 0/100 to 100/0, and thus, only one of the signals Dr and Sm may be set variable. In this case, the weighting-increase can be applied to one of the signals Dr and Dm that highly needs the weighting, and thus, much more effective damping correction control is expected.

In weighting both the damping correction signals Dr and Dm, a measure is employed through which the ratio of the size of the signal Dr to the size of the other signal Dm can be varied in accordance with both the steering torque signal Ts and the TB twist angle signal θt. Thus, even if, during the time when the damping control for the steering assist is being carried out, the steering condition changes, the ratio of the size of the damping correction signal can be varied in accordance with the steering condition, and thus, much effective damping correction amount can be calculated.

In this embodiment, when weighting both the damping correction signals Dr and Dm, a comparison between the rack end arriving time Tr and the mechanical end arriving time Tm is carried out so as to increase one of the damping correction signals Dr and Dm which has a shorter arriving time than the other. Accordingly, either one of the rack stopper side and the mechanical stopper side can reduce the frequency in contacting the end.

In this embodiment, for weighting both the damping correction signals Dr and Dm, a comparison between the rack end arriving time Tr and the mechanical end arriving time Tm is made.

Figure 6:
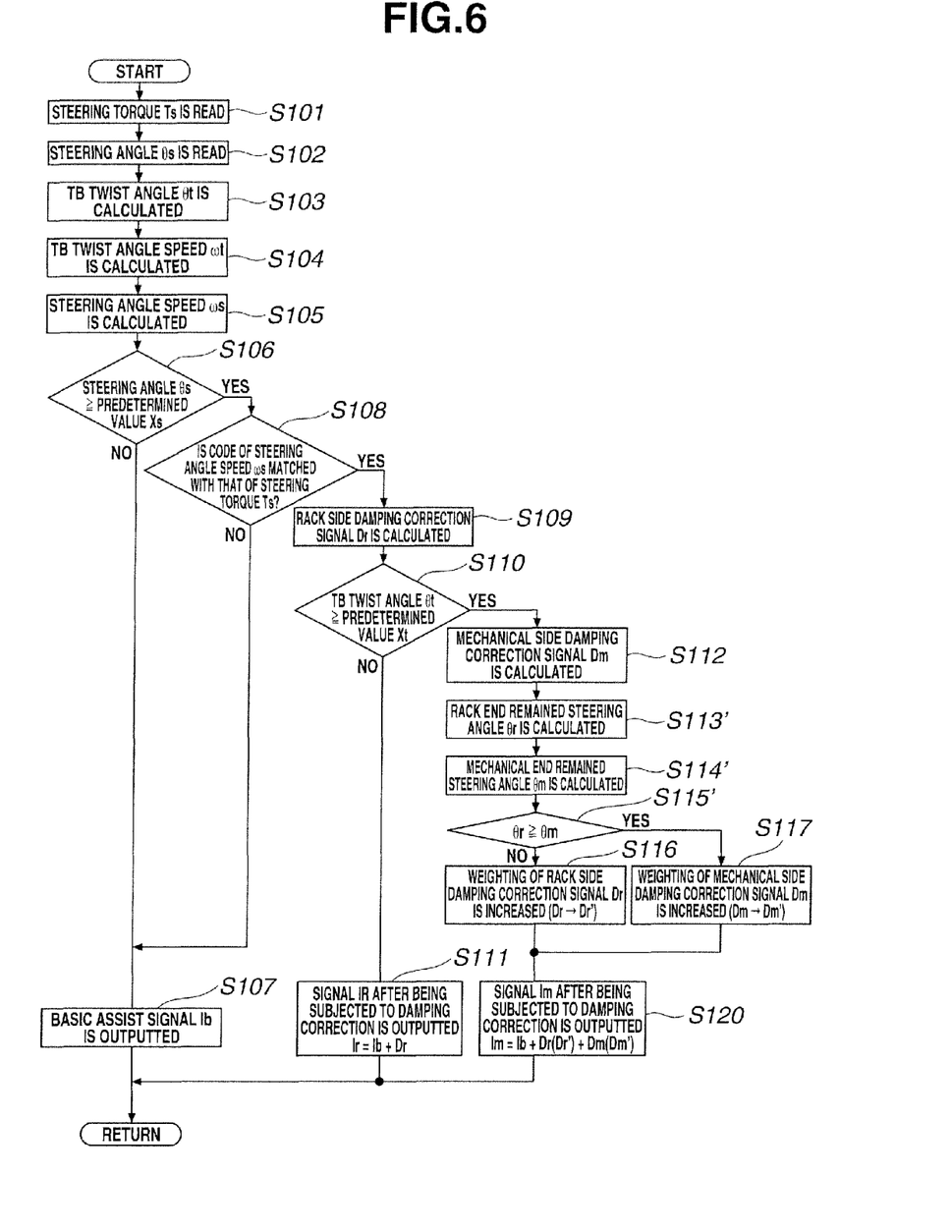
FIG. 6 is a flowchart showing programmed operation steps carried out in a control unit in a second modification of the first embodiment of the present invention.

However, the present invention is not limited to such measure. That is, in place of such measure, the following measure can be used. As is shown at steps S113', S114' and S115' of FIG. 6, angles (or remained angles) θr and θm that are remained until the rack and mechanical ends arrive at the contact positions are calculated, comparison between the remained angles θr and θm is carried out, and weighting the two correction signals Dr and Dm is made in accordance with the comparison. Parameters for the comparison may be changed in accordance with specifications of devices used.

Furthermore, the damping correction control including the above-mentioned weighting is repeated at a given cycle. Thus, when one of the sides that arrives at the stroke end interchanges fast, the ratio of the size between the damping correction signals Dr and Dm is reversed in accordance with the interchange, and thus, reduction of collision noise can be made in accordance with the interchanges.

Second Embodiment

Figure 7:
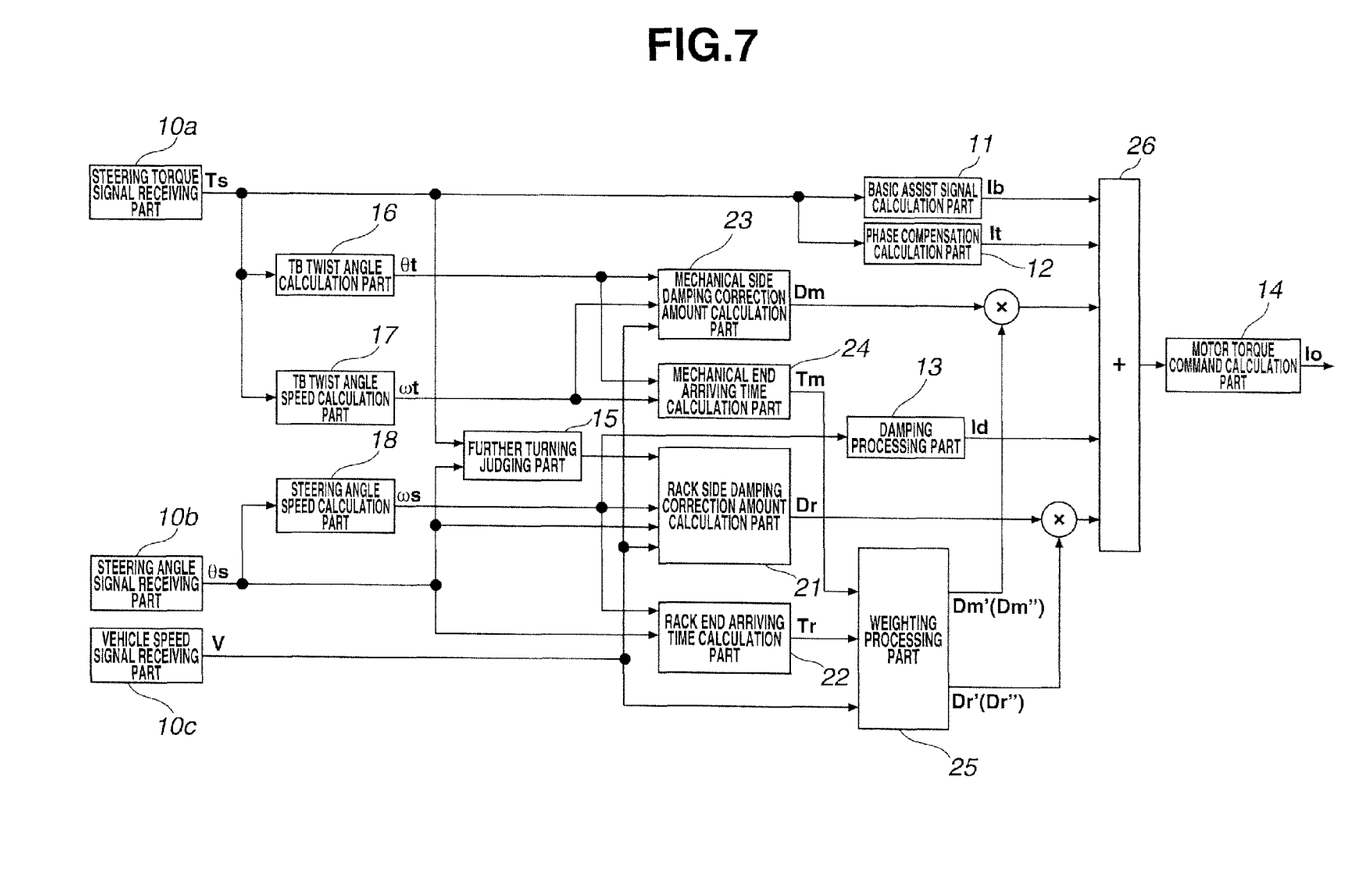
FIG. 7 is a block diagram of a control unit employed in a second embodiment of the present invention.
Figure 8:
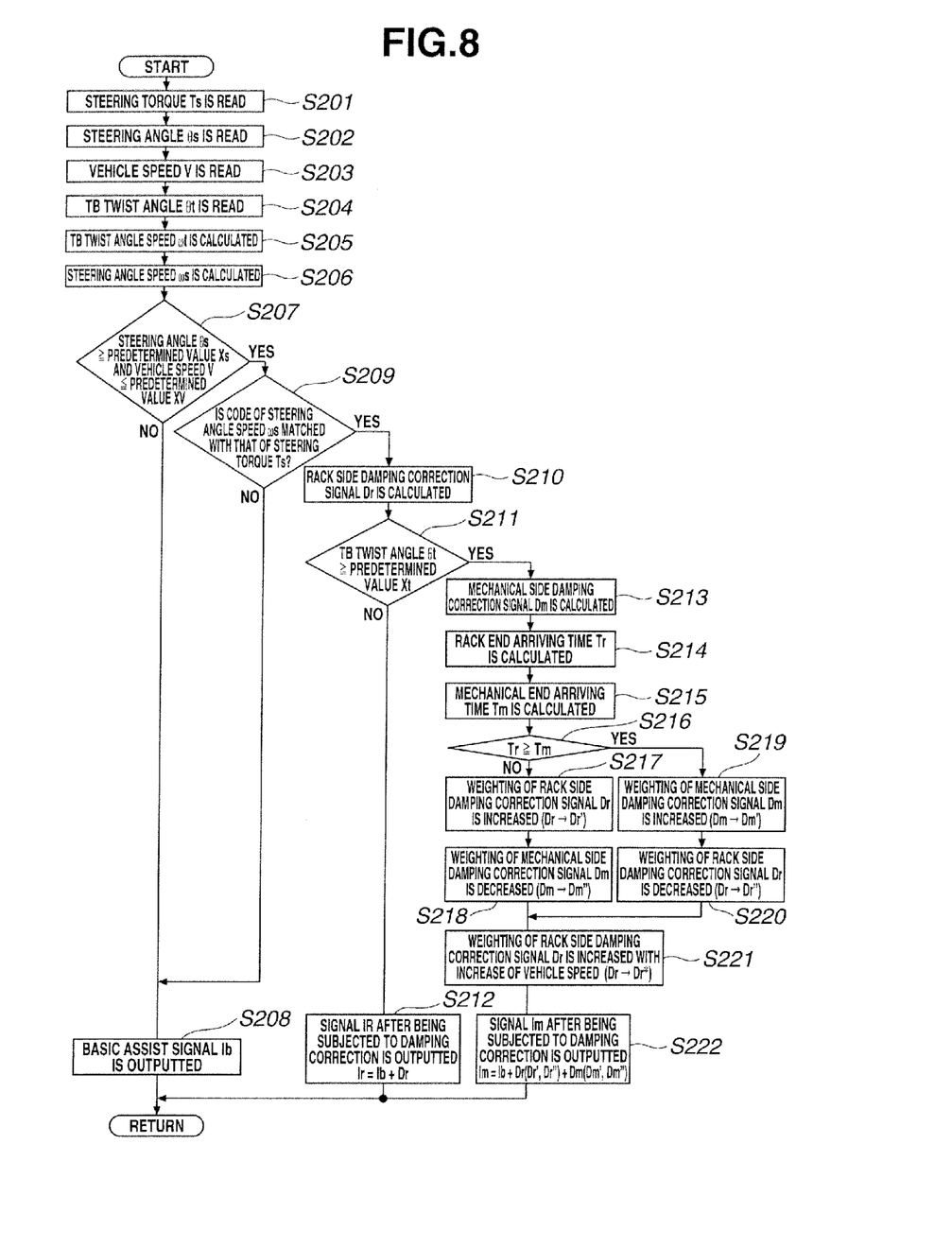
FIG. 8 is a flowchart showing programmed operation steps carried out in a control unit in the second embodiment of the present invention for carrying out a damping correction control to a steering assist torque.

Referring to FIGS. 7 and 8, there are respectively shown a block diagram of a control unit and a flowchart executed by the control unit, which are employed in an electric power steering device of a second embodiment of the present invention. As will become apparent as the description proceeds, in this second embodiment, a vehicle speed V is further employed as a parameter for controlling operation of the electric power steering device.

In the following description for the second embodiment, only parts and operation steps that are different from those of the above-mentioned first embodiment will be described in detail for simplification of description.

First, the second embodiment will be described in detail with the aid of FIG. 7 that shows a block diagram of a control unit employed in the second embodiment. That is, the control unit carries out a damping correction control of a steering assist torque in the second embodiment.

As is seen from FIG. 7, a control unit 8 (see FIG. 1) employed in the second embodiment further comprises, in addition to the above-mentioned various parts of the first embodiment, a vehicle speed signal receiving part 10c that receives a vehicle speed signal V detected by a vehicle speed sensor (not shown). The vehicle speed signal V received by the vehicle speed signal receiving part 10c is led to the rack side damping correction amount calculation part 21, the mechanical side damping correction amount calculation part 23 and the weighting process part 25.

In FIG. 8, there is shown the flowchart executed by the control unit in the second embodiment for carrying out the damping correction control of the steering assist torque.

As shown, at step S201, a steering torque signal Ts detected by a torque sensor TS (see FIG. 1) is read and then at step S202, a steering angle signal θs detected by a steering angle sensor (not shown) is read and then at step S203, a vehicle speed signal V detected by a vehicle speed sensor is read. Further, at a step S204, a TB twist angle signal θt is calculated based on the steering torque signal Ts and at step S205, a TB twist angular velocity signal ωt is calculated and then at step S206, a steering angle speed signal ωs is calculated based on the steering angle signal θs.

Then, at step S207, judgment is carried out as to whether or not the steering angle signal θs is equal to or larger than a predetermined value Xs and the vehicle speed signal V is equal to or smaller than a predetermined value Xv. If NO, the operation flow goes to step S208 where the basic assist signal Ib is outputted as the motor command signal Io ending the operation flow.

While, if YES at step S207, the operation flow goes to step S209 where judgment is carried out as to whether or not a code of the steering torque signal Ts coincides with that of the steering angular velocity signal ωs. If NO, the operation flow goes to step S208 where the basic assist signal Ib is outputted as the motor command signal Io.

While, if YES at step S209, the operation flow goes to step S210 where a rack side damping correction signal Dr is calculated, and then the operation flow goes to step S211 where judgment is carried out as to whether or not the TB twist angle θt is equal to or larger than a predetermined value Xt. If NO, the operation flow goes to step S212 where a damping corrected command signal I, which is provided by adding the rack side damping correction signal Dr to the basic assist signal Ib, is outputted as the motor command signal Io.

While, if YES at step S211, the operation flow goes to step S213 where a mechanical side damping correction signal Dm is calculated, to step S214 where a rack end arriving time Tr is calculated and to step S215 where a mechanical end arriving time Tm is calculated. Thereafter, the operation flow goes to step S216 where judgment is carried out as to whether or not the rack end arriving time Tr is equal to or longer than the mechanical end arriving time Tm.

If NO, the operation flow goes to step S217 where a rack side damping weighting increase correction signal Dr', which is provided by increasing the weighting of the rack side damping correction signal Dr by applying an increased gain to the rack side damping correction signal Dr, is calculated, and to step S218 where a mechanical side damping decrease correction signal Dm", which is provided by decreasing the weighting of the mechanical side damping correction signal Dm by applying a decreased gain to the mechanical side damping correction signal Dm, is calculated.

While, if YES at step S216, the operation flow goes to step S219 where a mechanical side damping increase correction signal Dm', which is provided by increasing the weighting of the mechanical side damping correction signal Dm by applying an increasing gain to the mechanical side damping correction signal Dm, is calculated, and then to step S220 where a rack side damping decrease correction signal Dr", which is provided by is decreasing the weighting of the rack side damping correction signal Dr by applying a decreased gain to the rack side damping correction signal Dr, is calculated.

From step S218 or step S220, the operation flow goes to step S221 where for the rack side damping increase correction signal Dr' and the mechanical side damping increase correction signal Dm', a rack side damping correction signal Dr*, which is provided by increasing the weighting of the rack side damping increase correction signal Dr' or the rack side damping decrease correction signal Dr" for increasing the rack side damping increase correction signal Dr' or the rack side damping decrease correction signal Dr" in accordance with increase of the vehicle speed signal V, is calculated.

Then, the operation flow goes to step S222 where a damping corrected command signal I, which is provided by adding to the basic assist signal Ib both the rack side damping correction signal Dr (viz., the rack side damping increase correction signal Dr' or rack side damping increase correction signal Dr") and the mechanical side damping correction signal Dm (viz., the mechanical side damping increase correction signal Dm'), is outputted as a motor command signal Jo.

As will be understood from the above, since a surface resistance given to road wheels of an associated motor vehicle from a road surface lowers as the vehicle speed increases, each of the rack stopper and mechanical stopper tends to induce easy or early contact. Accordingly, this fact (or tendency) is taken into consideration for the second embodiment. That is, in this second embodiment, the rack side damping correction signal Dr and the mechanical side damping correction signal Dm are treated to increase as the vehicle speed signal V increases, and thus, the damping correction signals can be suitably calculated based on the vehicle speed.

The surface resistance given to the road wheels of the motor vehicle from a road surface lowers as the vehicle speed increases, and thus the rack bar 3 (see FIG. 1) tends to arrive at its stroke end more quickly as the vehicle speed increases. Accordingly, in this embodiment, weighting of the rack stopper side is so made that the rack side damping correction signal Dr is increased as the vehicle speed signal V increases. Accordingly, contact of the rack end with the rack housing HG is suitably restrained.

When the vehicle speed comes up to a level higher than a predetermined level, the steering assist torque becomes almost zero. Accordingly, in this embodiment, the damping correction signal is made to zero for the output of the motor command signal Io when the vehicle speed is higher than the predetermined speed Xv, and thus, an excessive steering assist can be suppressed.

Third Embodiment

Figure 9:
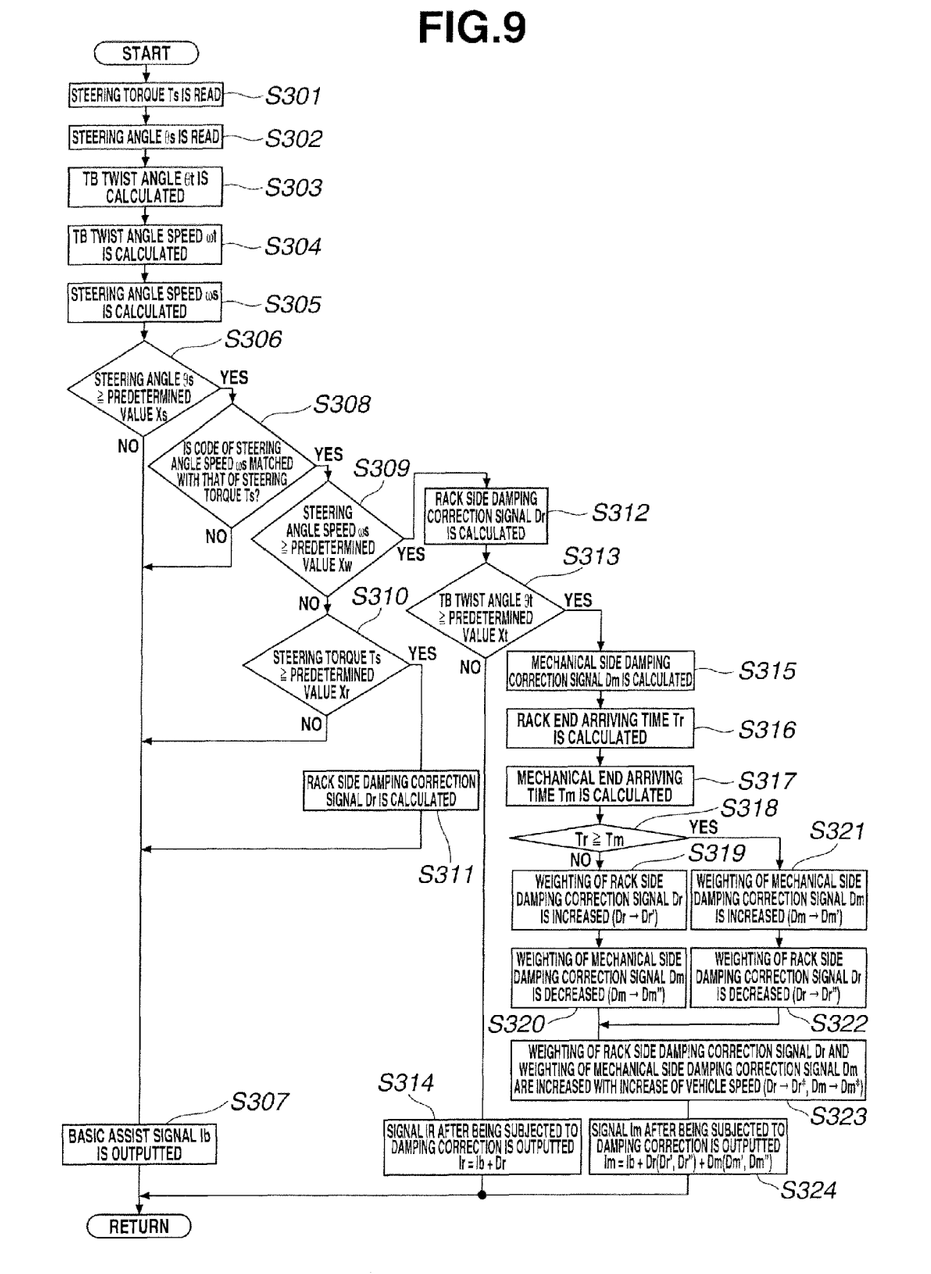
FIG. 9 is a flowchart showing programmed operation steps carried out in a control unit in a third embodiment of the present invention for carrying out a damping correction control to a steering assist torque.

Referring to FIG. 9, there is shown a flowchart depicting a damping correction control of a steering assist torque that is employed in a third embodiment of the present invention.

As shown, at step S301, a steering torque signal Ts detected by a torque sensor TS (see FIG. 1) is read and then at step S302, a steering angle signal θs detected by a steering angle sensor (not shown) is read and then at step S303, a TB twist angle θt is calculated based on the steering torque signal Ts, and at step S304, a TB twist angular velocity signal ωt is calculated and then at step S305, a steering angle speed signal ωs is calculated based on the steering angle signal θs.

Then, at step S306, judgment is carried out as to whether or not the steering angle signal θs is equal to or larger than a predetermined value Xs. If NO, the operation flow goes to step S307 where the basic assist signal Ib is outputted as the motor command signal Io ending the operation flow.

While, if YES at step S306, the operation flow goes to step S308 where judgment is carried out whether or not a cord of the steering torque signal Ts coincides with a code of the steering angular velocity signal ωs. If NO, the operation flow goes to step S307 where the basic assist signal Ib is outputted as the motor command signal Io ending the operation flow.

While if YES at step S308, the operation flow goes to step S309 where judgment is carried out as to whether or not the steering angular velocity signal ωs is equal to or larger than a predetermined value Xω. If NO, the operation flow goes to step S310 where judgment is carried out as to whether the steering torque signal Ts is equal to or larger than a predetermined value Xr. If NO, the operation flow goes to step S307 where the basis assist signal Ib is outputted as the motor command signal Io ending the operation flow. While, if YES at step S310, the operation flow goes to step S311 where a rack side damping correction control which has been made in the previous operation cycle is kept.

While, if YES at step S309, the operation flow goes to step S312 where a rack side damping correction signal Dr is calculated, and then to step S313 where judgment is carried out as to whether a TB twist angle θt is equal to or larger than a predetermined value Xt. If NO, the operation flow goes to step S314 where a damping corrected command signal Ir, which is provided by adding the rack side damping correction signal Dr to the basic assist signal Ib, is outputted as the motor command signal Io.

While, if YES at step S313, the operation flow goes to step S315 where a mechanical side damping correction signal Dm is calculated and to step S316 where a rack end arriving time Tr is calculated and then to step S317 where a mechanical end arriving time Tm is calculated.

Then, the operation flow goes to step S318 where judgment is carried out as to whether or not the rack end arriving time Tr is equal to or longer than the mechanical end arriving time Tm. If NO, the operation flow goes to step S319 where a rack side damping increase correction signal Dr', which is provided by increasing the weighting of the rack side damping correction signal Dr by applying an increasing gain to the rack side damping correction signal Dr, is calculated and goes to step S320 where a mechanical side damping correction signal Dm", which is provided by decreasing the weighting of the mechanical side damping correction signal Dm by applying a decreasing gain to mechanical side damping correction signal Dm, is calculated. Then, the operation flow goes to step S323 which will be described hereinafter.

While, if YES at step S318, the operation flow goes to step S321 where a mechanical side damping increase correction signal Dm', which is provided by increasing the weighting of the mechanical side damping correction signal Dm by applying an increasing gain to the mechanical side damping correction signal Dm, is calculated, and then goes to step S322 where a rack side damping decrease correction signal Dr", which is provided by decreasing the weighting of the rack side damping correction signal Dr by applying a decreasing gain to the rack side damping correction signal Dr, is calculated. Then, the operation flow goes to step S323 to which the operation flow from step S320 goes also.

At this step S323, for the rack side damping increase correction signal Dr' and the mechanical side damping increase correction signal Dm', a rack side damping correction signal Dr*, which is provided by increasing the weighting of the rack side damping increase correction signal Dr' or the rack side damping decrease correction signal Dr" for increasing the rack side damping increase correction signal Dr' or the rack side damping decrease correction signal Dr" in accordance with increase of the vehicle speed signal V, is calculated.

Then, the operation flow goes to step S324 where a damping corrected command signal Im, which is provided by adding to the basic assist signal Ib both the rack side damping correction signal Dr (viz., the rack side damping increase correction signal Dr' or rack side damping increase correction signal Dr") and the mechanical side damping correction signal Dm (viz., the mechanical side damping increase correction signal Dm'), is outputted as a motor command signal Io.

As will be understood from the above, with increase of the steering speed, the rack stopper or the mechanical stopper tends to induce easy or early contact. Accordingly, in this third embodiment, the rack side damping correction signal Dr and the mechanical side damping correction signal Dm are treated to increase as the steering angular velocity signal ωs increases, and thus, a suitable damping correction signal is calculated in accordance with a steering condition.

While, when the steering angular velocity signal ωs is low, the tendency of the contact for the rack stopper and mechanical stopper becomes low. However, when the steering torque Ts is large, the larger steering torque is left large because of restriction of the steering assist torque by the damping correction signal, and thus, in such case, it tends to occur that the steering angular velocity signal ωs is kept low. If, under such state, the damping correction control is stopped, the rack end may arrives at both ends of the rack housing HG. Thus, by continuing the damping correction control when given conditions are satisfied, the contact of the rack end to the rack housing HG can be suppressed.

As will be understood from the above, in the present invention, the damping correction amount is calculated by taking both the rack end arriving time and the mechanical end arriving time into consideration. Accordingly, undesired phenomena, such as production of noises and deterioration of steering feeling, which would be caused when the damping correction amount is calculated based on only the rack end arriving time, can be suppressed.

In the present invention as modified, when the steered angle and the torsion bar twist amount exceed the first and second given angles respectively, both the first and second damping signals are used for calculating the damping correction amount, and thus, both the two damping controls can be made at the same time.

In the present invention as modified, by controlling the ratio in size between the first and second damping signals that are applied to the basic assist command signal, a suitable damping correction amount can be obtained in accordance with the steering condition.

In the present invention as modified, by increasing the damping correction amount of either one of the rack bar and the first and second stopper parts, which effects the fastest stroke end, the frequency of the stopping can be reduced.

In the present invention as modified, a stroke end arriving time and a contact establishing time between the first and second stopper parts are calculated, and the damping correction amount of one of the times which is shorter is increased. With this, the frequency in which either one of the rack bar and the first and second stopper parts brings about a contact can be reduced.

In the present invention as modified, upon a change of degree of urgency, the ratio in size between the first and second damping signals is reversed. Thus, the damping control can be made in accordance with various conditions.

In the present invention as modified, the control can be carried out based on only the first damping signal or only the second damping signal. Thus, weighting of the side that needs a higher urgency can be increased.

In the present invention as modified, in case where a steering condition changes during the damping control, the ratio between the first and second damping signals can be controlled in accordance with the steering condition, and thus, a suitable damping amount can be provided according to the steering condition.

In the present invention as modified, when the steering wheel is turned back, the end stopping does not take place and on the contrary there is such a fear that the turn-back rotation of the steering wheel would be influenced. Thus, in this modification, only when the steering wheel is turned further in the same direction, the command signal including the damping amount is outputted. With this, the above-mentioned fear is overcome. If at least the command signal does not include the damping amount, the damping correction amount calculation part may calculate the damping correction amount or not.

In the present invention as modified, by effecting the mechanical end stopping prior to the rack bar end stopping, the durability of bushes provided by the rack stopper can be increased.

In the present invention as modified, shocks applied to sensor parts such as the torque sensor and the like mounted on the steering shaft can be suppressed.

In the present invention as modified, since a surface resistance given to road wheels of the motor vehicle from a road surface lowers as the vehicle speed increases, each of the rack stopper and mechanical stopper tends to induce easy or early contact. Thus, in this modification, the damping correction amount is increased as the vehicle speed increases.

In the present invention as modified, when the vehicle speed is equal to or higher than the given vehicle speed, the power assist amount is almost zero. Thus, by setting the damping correction amount to zero, excessive assist can be suppressed. If at least the command signal does not contain the damping correction amount, the damping correction amount calculation part may carry out the damping correction amount or not.

In the present invention as modified, since the road surface resistance applied to the road wheels of the motor vehicle is reduced as the vehicle speed increases, the rack bar stopping phenomena tend to easily occur with increase of the vehicle speed. Thus, by increasing the weighting of the rack bar side, the rack bar stopping can be suppressed.

In the present invention as modified, since the end stopping phenomena take place more easily as the steering speed increases, by increasing the damping signal, the damping signal can be made in accordance with the steering condition. While, in case where the steering speed is low, the possibility of the end stopping phenomena is low. While, when the steering torque is large, the assist amount is restricted by the damping correction amount thereby increasing the steering torque, so that it sometimes occur that the steering speed is lowered. If the damping correction is stopped under such case, the rack bar stopping tends to occur. Accordingly, when the above-mentioned conditions are satisfied, the damping control is continued for suppressing the rack bar stopping phenomena.

The present invention is not limited to the above-mentioned embodiments and modifications.

Some of them will be briefly described in the following.

In the above description, the steering torque signal Ts processed by the electronic control unit 8 is a signal that is directly detected by the toque sensor TS in the steering torque signal receiving part 10a. However, if desired, the steering torque signal Ts may be calculated based on rotational angles of the input and output shafts 1 and 2.

In the above description, the steering angle signal (θs) is detected by the steering angle sensor. However, if desired, the steering angle signal may be provided by processing a rotation angle of the output shaft 2 of the torque sensor TS or a rotation angle of a rotation angle sensor of the electric motor 7.

The entire contents of Japanese Patent Application 2014-205350 filed Oct. 6, 2014 are incorporated herein by reference.

Although the invention has been described above with reference to embodiments of the invention, the invention is not limited to such embodiments as described above. Various modifications and variations of such embodiments may be carried out by those skilled in the art, in light of the above description.

What is claimed is:

1. An electric power steering device comprising:
   a steering mechanism including a first shaft connected to a steering wheel, a second shaft connected to the first shaft through a torsion bar and a rack bar connected to the second shaft through a rack-and-pinion mechanism;
   a mechanical stopper including first and second stopper parts respectively provided by the first and second shafts, the first and second stopper parts being brought into contact to each other to suppress a further relative rotation between the first and second shafts when the first and second shafts make a given amount of relative rotation therebetween while twisting the torsion bar;
   an electric motor that provides the steering mechanism with a steering power for assisting a steering operation applied to the steering wheel; and
   a control unit for controlling the electric motor, the control unit including:
   a steering torque signal receiving part into which a steering torque signal produced in the steering mechanism is received;
   a steering angle signal receiving part into which a steering angle signal representing a steered angle of a steered road wheel is received;
   a torsion bar twist amount signal receiving part into which a torsion bar twist amount signal, which represents a twisted amount of the torsion bar, is received;
   a basic assist command signal calculation part by which a basic assist command signal for the electric motor is calculated based on the steering torque signal;
   a first damping signal calculation part that calculates a first damping signal when the steering angle signal represents that the steered angle is equal to or greater than a first given angle and the steering wheel is being turned further in the same direction, the first damping signal representing a damping force against a steering force produced by the electric motor when the steering wheel is turned further in the same direction;
   a second damping signal calculation part that calculates a second damping signal when the torsion bar twist amount signal represents that the torsion bar twist amount is equal to or greater than a second given angle and the steering wheel is being turned further in the same direction, the second damping signal representing a damping force against a steering force produced by the electric motor when the steering wheel is turned further in the same direction;
   a damping correction amount calculation part that calculates a damping correction amount, which is a correction amount of the basic assist command signal effected by the first and second damping signals, based on either one of the steering angle signal, a first control amount calculated based on the steering angle signal, the torsion bar twist amount signal and a second control amount calculated based on the torsion bar twist amount signal; and
   a motor command signal output part that outputs to the electric motor a command signal based on the basic assist command signal and the damping correction amount.

2. An electric power steering device as claimed in claim 1, in which the damping correction amount calculation part calculates the damping correction amount based on both the first damping signal and the second damping signal when the steered angle signal represents that the steered angle is equal to or greater than the first given angle and the torsion bar twist amount signal represents that the torsion bar twist amount is equal to or greater than the second given angle.

3. An electric power steering device as claimed in claim 2, in which the damping correction amount calculation part controls a ratio in size between the first and second damping signals that are applied to the basic assist command signal.

4. An electric power steering device as claimed in claim 3, in which the damping correction amount calculation part controls said ratio in such a manner as to increase the damping correction amount of either one of the rack bar and the first and second stopper parts, which carries out a fastest stroke end.

5. An electric power steering device as claimed in claim 3, in which the damping correction amount calculation part controls said ratio in such a manner as to increase the damping correction amount of either one of a stroke end arriving time of the rack bar and a contact establishing time between the first and second stopper parts, which is shorter than the other.

6. An electric power steering device as claimed in claim 5, in which the damping correction amount calculation part reverses said ratio when a side having established a fastest end arriving time changes.

7. An electric power steering device as claimed in claim 3, in which the damping correction amount calculation part controls said ratio in such a manner as to control the ratio from 0:100 to 100:0.

8. An electric power steering device as claimed in claim 3, in which when the motor command signal output part is outputting the command signal to the electric motor based on the basic assist command signal and the damping correction amount, the damping correction amount calculation part controls said ratio based on both the steered signal and the torsion bar twist amount signal.

9. An electric power steering device as claimed in claim 1, in which the motor command signal output part outputs, to the electric motor, the command signal including the first and second damping signals only when the steering wheel is further turned in the same direction.

10. An electric power steering device as claimed in claim 1, in which the damping correction amount calculation part controls a ratio in size between the first and second damping signals in such a manner that the contact between the first and second stopper parts takes place prior to the arriving of the rack bar at the stroke end.

11. An electric power steering device as claimed in claim 1, in which the damping correction amount calculation part controls a ratio in size between the first and second damping signals in such a manner that the arriving of the rack bar at the stroke end takes place prior to the contact between the first and second stopper parts.

12. An electric power steering device as claimed in claim 1, in which the control unit further comprises a vehicle speed signal receiving part that receives a vehicle speed signal, and in which the damping correction amount calculation part calculates the damping correction amount in such a manner as to increase the damping correction amount as the vehicle speed increases.

13. An electric power steering device as claimed in claim 12, in which when the vehicle speed is equal to or higher than the given vehicle speed, the motor command signal output part outputs to the electric motor a command signal that has the damping correction amount set to zero.

14. An electric power steering device as claimed in claim 12, in which the damping correction amount calculation part controls said ratio in such a manner that the ratio of the first damping signal to the second damping signal increases as the vehicle speed increases.

15. An electric power steering device as claimed in claim 1, in which the control unit further includes a steering speed receiving part, in which the first and second damping signal calculation parts respectively increase the first and second damping signals as the steering speed increases, and in which when the steering speed is equal to or lower than a given speed, the size of the steering torque signal is equal to or larger than a given size, the steering angle signal represents that the steering angle is equal to or larger than the first given angle and the steering wheel is being turned further in the same direction, the first damping signal calculation part calculates the first damping signal and the motor command signal output part outputs to the electric motor a command signal that includes the first damping signal.

16. A control device for controlling an electric power steering device, the electric power steering device including a steering mechanism that includes a first shaft connected to a steering wheel, a second shaft connected to the first shaft through a torsion bar and a rack bar connected to the second shaft through a rack-and-pinion mechanism, a mechanical stopper that includes first and second stopper parts respectively provided by the first and second shafts, wherein the first and second stopper parts are brought into contact to each other to suppress a relative rotation between the first and second shafts when the first and second shafts make a given relative rotation therebetween while twisting the torsion bar, and an electric motor that provides the steering mechanism with steering power for assisting a steering operation applied to the steering wheel, said control device comprising:
- a steering torque signal receiving part into which a steering torque signal produced in the steering mechanism is received;
- a steering angle signal receiving part into which a steering angle signal representing a steered angle of a steered road wheel is received;
- a torsion bar twist amount signal receiving part into which a torsion bar twist amount signal, which represents a twisted amount of the torsion bar, is received;
- a basic assist command signal calculation part by which a basic assist command signal for the electric motor is calculated based on the steering torque signal;
- a first damping signal calculation part that calculates a first damping signal when the steering angle signal represents that the steered angle is equal to or greater than a first given angle and the steering wheel is being turned further in the same direction, the first damping signal representing a damping force against a steering force produced by the electric motor when the steering wheel is turned further in the same direction;
- a second damping signal calculation part that calculates a second damping signal when the torsion bar twist amount signal represents that the torsion bar twist amount is equal to or greater than a second given angle and the steering wheel is being turned further in the same direction, the second damping signal representing a damping force against a steering force produced by the electric motor when the steering wheel is turned further in the same direction;
- a damping correction amount calculation part that calculates a damping correction amount, which is a correction amount of the basic assist command signal effected by the first and second damping signals, based on either one of the steering angle signal, a first control amount calculated based on the steering angle signal, the torsion bar twist amount signal and a second control amount calculated based on the torsion bar twist amount signal; and
- a motor command signal output part that outputs to the electric motor a command signal based on the basic assist command signal and the damping correction amount.

17. A control device as claimed in claim 16, in which the damping correction amount calculation part calculates the damping correction amount based on both the first damping signal and the second damping signal when the steered angle signal represents that the steered angle is equal to or greater than the first given angle and the torsion bar twist amount signal represents that the torsion bar twist amount is equal to or greater than the second given angle.

18. A control device as claimed in claim 17, in which the damping correction amount calculation part controls a ratio in size between the first and second damping signals that are applied to the basic assist command signal.

19. A control device as claimed in claim 18, in which the damping correction amount calculation part controls said ratio in such a manner as to increase the damping correction amount of either one of the rack bar and the first and second stopper parts, which carries out a fastest stroke end.

20. A control device as claimed in claim 16, which further includes a steering speed receiving part, in which the first and second damping signal calculation parts respectively increase the first and second damping signals as the steering speed increases, and in which when the steering speed is equal to or lower than a given speed, the size of the steering torque signal is equal to or larger than a given size, the steering angle signal represents that the steering angle is equal to or larger than the first given angle and the steering wheel is being turned further in the same direction, the first damping signal calculation part calculates the first damping signal and the motor command signal output part outputs to the electric motor a command signal that includes the first damping signal.

* * * * *